US009103095B2

(12) United States Patent
Nishikawa et al.

(10) Patent No.: US 9,103,095 B2
(45) Date of Patent: Aug. 11, 2015

(54) HYDRAULIC CIRCUIT CONTROL DEVICE AND WORK MACHINE

(75) Inventors: Hiroyasu Nishikawa, Tokyo (JP); Sei Shimahara, Tokyo (JP); Manabu Nakanishi, Hyogo (JP); Masashi Shibata, Hyogo (JP)

(73) Assignee: Caterpillar SARL, Geneva (CH)

( * ) Notice: Subject to any disclaimer, the term of this patent is extended or adjusted under 35 U.S.C. 154(b) by 625 days.

(21) Appl. No.: 13/502,166

(22) PCT Filed: Dec. 27, 2011

(86) PCT No.: PCT/JP2011/080312
§ 371 (c)(1),
(2), (4) Date: Apr. 16, 2012

(87) PCT Pub. No.: WO2012/091059
PCT Pub. Date: Jul. 5, 2012

(65) Prior Publication Data

US 2012/0260646 A1 Oct. 18, 2012

(30) Foreign Application Priority Data

Dec. 28, 2010 (JP) ................................ 2010-292878

(51) Int. Cl.

| | |
|---|---|
| ***F16D 31/02*** | (2006.01) |
| ***E02F 9/22*** | (2006.01) |
| ***F15B 13/06*** | (2006.01) |
| ***F15B 13/08*** | (2006.01) |

(52) U.S. Cl.
CPC ............ *E02F 9/2228* (2013.01); *E02F 9/2285* (2013.01); *E02F 9/2292* (2013.01); *E02F 9/2296* (2013.01); *F15B 13/06* (2013.01); *F15B 13/08* (2013.01)

(58) Field of Classification Search
CPC ..... E02F 9/2296; E02F 9/2285; E02F 9/2225; F15B 2211/30525; F15B 2211/50518; F15B 2211/5151
USPC .......................................... 60/452, 468, 420
See application file for complete search history.

(56) References Cited

U.S. PATENT DOCUMENTS 5,232,406 A 8/1993 Sato
5,873,245 A * 2/1999 Kato et al. ..................... 60/445
(Continued)

FOREIGN PATENT DOCUMENTS

CN 1676785 A 10/2005
EP 1584822 A2 10/2005
(Continued)

OTHER PUBLICATIONS

Extended European Search Report issued in Euorpean Patent Application No. 11852327.3 mailed Nov. 25, 2013.
(Continued)

*Primary Examiner* — Edward Look
*Assistant Examiner* — Jason Mikus
(74) *Attorney, Agent, or Firm* — McDermott, Will & Emery LLP

(57) ABSTRACT

A controller controls the solenoid-operated variable pressure relief valves that are provided to control, at set pressures that can be electrically commanded, pressure of hydraulic oil fed to an attachment cylinder. The controller is provided with a control logic that is capable of controlling the aforementioned solenoid-operated variable pressure relief valves. The control logic performs the aforementioned calculation by compensating for pressure override characteristics of each solenoid-operated variable pressure relief valve based on input signals related to the set relief pressure for and a relief valve passing flow rate of the solenoid-operated variable pressure relief valve, and outputting to the solenoid-operated variable pressure relief valve command signals related to the adjusted set relief pressure resulting from the compensation of the pressure override characteristics.

5 Claims, 9 Drawing Sheets

(56) References Cited

U.S. PATENT DOCUMENTS

| | | | |
|---|---|---|---|
| 7,174,711 | B2 | 2/2007 | Nanjo et al. |
| 2003/0149520 | A1 | 8/2003 | Taniguchi et al. |
| 2005/0229594 | A1 | 10/2005 | Nanjo et al. |

FOREIGN PATENT DOCUMENTS

| | | | |
|---|---|---|---|
| JP | 62-86919 | A | 4/1987 |
| JP | 2-62221 | A | 3/1990 |
| JP | 4-248060 | A | 9/1992 |
| JP | 5-146900 | A | 6/1993 |
| JP | 2003-48016 | A | 2/2003 |
| JP | 2010-236607 | A | 10/2010 |

OTHER PUBLICATIONS

Chinese Office Action issued in corresponding Chinese Patent Application No. 201180023233.8 dated Jan. 6, 2015.

* cited by examiner

HYDRAULIC CIRCUIT CONTROL DEVICE AND WORK MACHINE

CROSS REFERENCE TO PRIOR APPLICATIONS

This application is a U.S. National Phase application under 35 U.S.C. §371 of International Application No. PCT/JP2011/080312, filed on Dec. 27, 2011 and claims benefit of priority to Japanese Patent Application No. 2010-292878, filed on Dec. 28, 2010. All of these applications are herein incorporated by reference.

TECHNICAL FIELD

The present invention relates to a hydraulic circuit control device provided with a solenoid-operated variable pressure relief valve. The present invention further relates to a work machine that is provided with such a control device.

BACKGROUND

As shown in FIG. 8, a tool control system used in a hydraulic circuit of a work machine employs solenoid-operated variable pressure relief valves 5 that are provided on external output lines 4 through which hydraulic oil discharged from variable delivery pumps 1 is controlled by a control valve 2 and fed to an attachment tool 3. Thus provided, the solenoid-operated variable pressure relief valves 5 serve as external relief valves. As shown in FIG. 9, each solenoid-operated variable pressure relief valve 5 is designed to set relief pressure in response to a command electric current value A0-A7. Therefore, as shown in FIG. 8, the tool control system is designed so that a machine controller 7 outputs to each solenoid-operated variable pressure relief valve 5 an electric current value selected from among the command electric current values A0-A7 based on a relief pressure that has been set by means of a monitor 6 installed in the cab of a construction machine or the like. Thus, the set relief pressure for each solenoid-operated variable pressure relief valve 5 can be changed easily without the necessity of manually turning a screw that is attached to the relief valve.

With the conventional tool control system, however, once a relief pressure is set based on a given electric current value, the relief valve is controlled by the constant current that corresponds to the set relief pressure. Therefore, as shown in FIG. 9, when the flow rate of the hydraulic oil passing through the relief valve increases, there arise pressure override characteristics, in other words an increase in pressure caused by valve resistance, resulting in a difference between the set relief pressure and the actual pressure.

On the other hand, examples of hydraulic control of such apparatuses as a hydraulic press include a pressure control shown in FIG. 10, wherein a control device 9 compensates for pressure override characteristics of a solenoid-operated variable pressure relief valve 10 based on a commanded pump flow rate represented by a signal that transmits a command to control the flow rate of hydraulic oil discharged from a variable delivery pump 8 (e. g. see Japanese Laid-open Patent Publication No. 5-146900 ("JP '900") (p 2, and FIG. 1)).

The technology for pressure override compensation described in JP '900 is for compensating for pressure override characteristics of a solenoid-operated variable pressure relief valve based on a commanded pump flow rate. Therefore, when employed in a machine that is provided with a plurality of hydraulic actuators, the technology is incapable of compensating for pressure override of relief pressure for a specific hydraulic actuator with high accuracy.

In order to solve the above problem, an object of the invention is to improve accuracy of relief pressure with respect to a set relief pressure of a solenoid-operated variable pressure relief valve that is provided for controlling pressure of a specific hydraulic actuator.

SUMMARY

An example of the present invention relates to a hydraulic circuit control device for controlling a hydraulic circuit that serves to operate a hydraulic actuator by means of hydraulic fluid. The hydraulic circuit control device includes a solenoid-operated variable pressure relief valve and a control means. The solenoid-operated variable pressure relief valve controls pressure of the hydraulic fluid fed to the aforementioned hydraulic actuator at a set relief pressure that can be electrically commanded. Based on input signals related to the set relief pressure for and a relief valve passing flow rate of the aforementioned solenoid-operated variable pressure relief valve, the control means compensates for pressure override characteristics of the solenoid-operated variable pressure relief valve and outputs to the solenoid-operated variable pressure relief valve a command signal related to an adjusted set relief pressure resulting from the compensation of the pressure override characteristics.

According to another example of the present invention, the control means of the hydraulic circuit control device according to the above example includes an override compensation pressure calculation section and a subtraction section. The override compensation pressure calculation section has a function of calculating an override compensation pressure for compensating for the aforementioned pressure override characteristics, the override compensation pressure calculation section performing the calculation by inputting the set relief pressure and the relief valve passing flow rate to a three-dimensional map that is created beforehand based on the relationship of the set relief pressure, the relief valve passing flow rate, and the override compensation pressure. By subtracting from the aforementioned set relief pressure the override compensation pressure calculated by the override compensation pressure calculation section, the subtraction section calculates an adjusted set relief pressure resulting from the compensation of pressure override characteristics.

According to a further example, the present invention includes an override compensation pressure calculation section and a subtraction section. The override compensation pressure calculation section has a function of calculating an override compensation pressure by determining characteristics of a relationship between a relief valve passing flow rate and an override pressure by inputting a set relief pressure to a two-dimensional map that is created beforehand based on the relationship between a plurality of set relief pressures and override pressures at a constant flow rate resulting from linear approximation of the pressure override characteristics with respect to the relief valve passing flow rates at the respective set relief pressures, and multiplying the determined characteristics of the relationship between the relief valve passing flow rate and the override pressure by the relief valve passing flow rate. By subtracting from the aforementioned set relief pressure the override compensation pressure calculated by the override compensation pressure calculation section, the subtraction section calculates an adjusted set relief pressure resulting from the compensation of pressure override characteristics.

An example of the present invention, the hydraulic circuit control device according to any one of the above examples is provided with a negative flow control pressure line, a pump flow rate limiting controller, and an input means. The negative flow control pressure line guides negative flow control pressure from a center bypass line of a control valve that serves to control a plurality of hydraulic actuators to a capacity adjustment means of a variable delivery pump. The pump flow rate limiting controller is provided on the negative flow control pressure line so as to limit pump flow rate based on a pump flow rate limiting value that is assigned to a specific actuator. The pump flow rate limiting value to be output to the pump flow rate limiting controller is set in the input means. The control means uses, as an estimated value representing a flow rate of the hydraulic fluid passing through a solenoid-operated variable pressure relief valve that controls the aforementioned specific actuator, the pump flow rate limiting value set in the input means.

A yet further example of the present invention relates to a work machine including a machine body; a work equipment mounted on the machine body and adapted to be operated by a plurality of hydraulic actuators; an attachment tool attached to the distal end of the work equipment; and a hydraulic circuit control device according to any one of the above examples of the present invention and provided for the hydraulic actuator for operating the attachment tool.

Accordingly, based on input signals related to a set relief pressure for and a relief valve passing flow rate of a solenoid-operated variable pressure relief valve for controlling a line to a hydraulic actuator at the set relief pressure, the control means compensates for pressure override characteristics of the solenoid-operated variable pressure relief valve and outputs to the solenoid-operated variable pressure relief valve a command signal related to the adjusted set relief pressure. Therefore, the present examples are capable of improving accuracy of relief pressure with respect to a set relief pressure for a solenoid-operated variable pressure relief valve that is provided for controlling pressure of a specific hydraulic actuator.

According to another example of the present invention, exact override compensation can be performed by using the override compensation pressure calculation section, which is provided with the three-dimensional map, as well as the subtraction section for calculating an adjusted set relief pressure, which is an adjusted set relief pressure resulting from pressure override compensation.

According to a further example of the present invention, override compensation can be easily performed by using the override compensation pressure calculation section, which is provided with the two-dimensional map created by linear approximation of the aforementioned pressure override characteristics with respect to the relief valve passing flow rates, as well as the subtraction section for calculating an adjusted set relief pressure resulting from the pressure override compensation.

According to yet another example, the control means uses, as an estimated value representing a flow rate of the hydraulic fluid passing through a solenoid-operated variable pressure relief valve for that controls the aforementioned specific actuator, the pump flow rate limiting value set in the input means and to be output to the pump flow rate limiting controller, which is provided on the negative flow control pressure line so as to limit pump flow rate based on a pump flow rate limiting value that is assigned to the specific actuator. Therefore, a flow rate of the hydraulic fluid passing through the solenoid-operated variable pressure relief valve can be estimated easily by using a pump flow rate limiting value set in the input means.

According to an example thereof, the present invention is capable of providing a work machine of which accuracy of the relief pressure with respect to a set relief pressure for a solenoid-operated variable pressure relief valve that serves to control pressure of a specific actuator for operating the attachment tool attached to the distal end of the work equipment can be improved by compensating for pressure override characteristics of the solenoid-operated variable pressure relief valve.

DESCRIPTION OF EXAMPLES

Next, examples of the present invention are explained in detail hereunder, referring to an example thereof shown in FIGS. 1 to 7.

Figure 6:
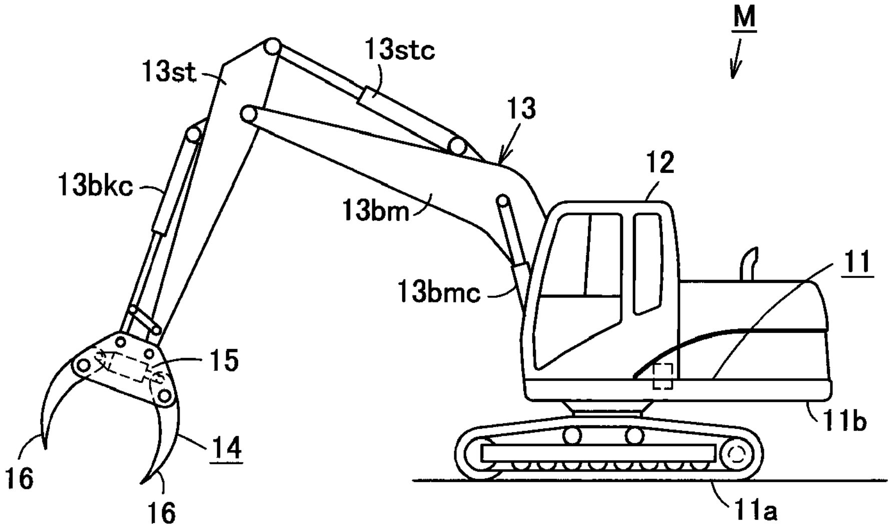
FIG. 6 is a side view of a work machine equipped with the control device.

FIG. 6 illustrates a hydraulic excavator-type work machine M, of which a machine body 11 has a lower structure 11*a* and an upper structure 11*b*. The upper structure 11*b* is rotatably mounted on the lower structure 11*a*. A cab 12 and a work equipment 13 are mounted on the machine body 11, and an attachment tool 14 is removably attached to the distal end of the work equipment 13.

Examples of attachment tools of this type include various tools, such as a hydraulic breaker (a hammer), that use a single acting circuit, and also tools, such as a grapple or a crusher, that use a double acting circuit. Examples of tools using a double acting circuit include an attachment tool 14 shown in FIG. 6, wherein a pair of gripping blades 16 or the like are opened and closed by an attachment cylinder 15, which is a hydraulic actuator and serves as a specific actuator.

The work equipment 13 includes a boom 13*bm* and a stick 13*st*. The base end of the boom 13*bm* is supported on the upper structure 11*b* by a shaft so that the boom 13*bm* is capable of pivoting vertically. The stick 13*st* is pivotally supported at the distal end of the boom 13*bm* by a shaft. The aforementioned attachment tool 14 is pivotally supported at the distal end of the stick 13*st* by a shaft. The boom 13*bm*, the stick 13*st*, and the attachment tool 14 are adapted to be pivoted by boom cylinders 13*bmc*, stick cylinders 13*stc*, and a bucket cylinder 13*bkc*, respectively. The attachment tool 14 is adapted to be opened and closed by the attachment cylinder 15.

Figure 1:
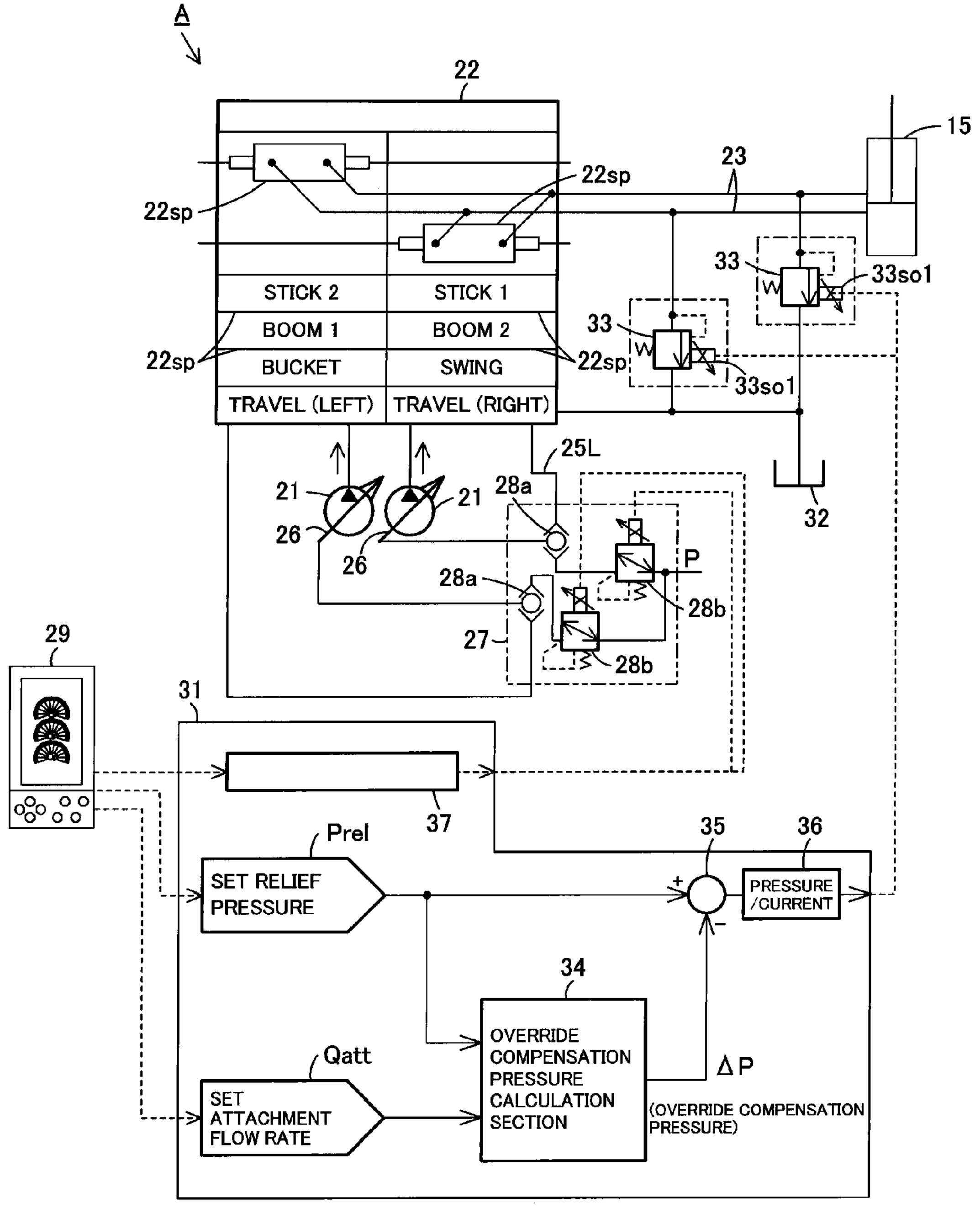
FIG. 1 is a circuit configuration diagram showing an embodiment of a hydraulic circuit control device according to an example.

The work machine M shown in FIG. 6 described above is equipped with a hydraulic circuit control device A shown in FIG. 1. The hydraulic fluid controlled by the control device A is hydraulic oil.

Figure 7:
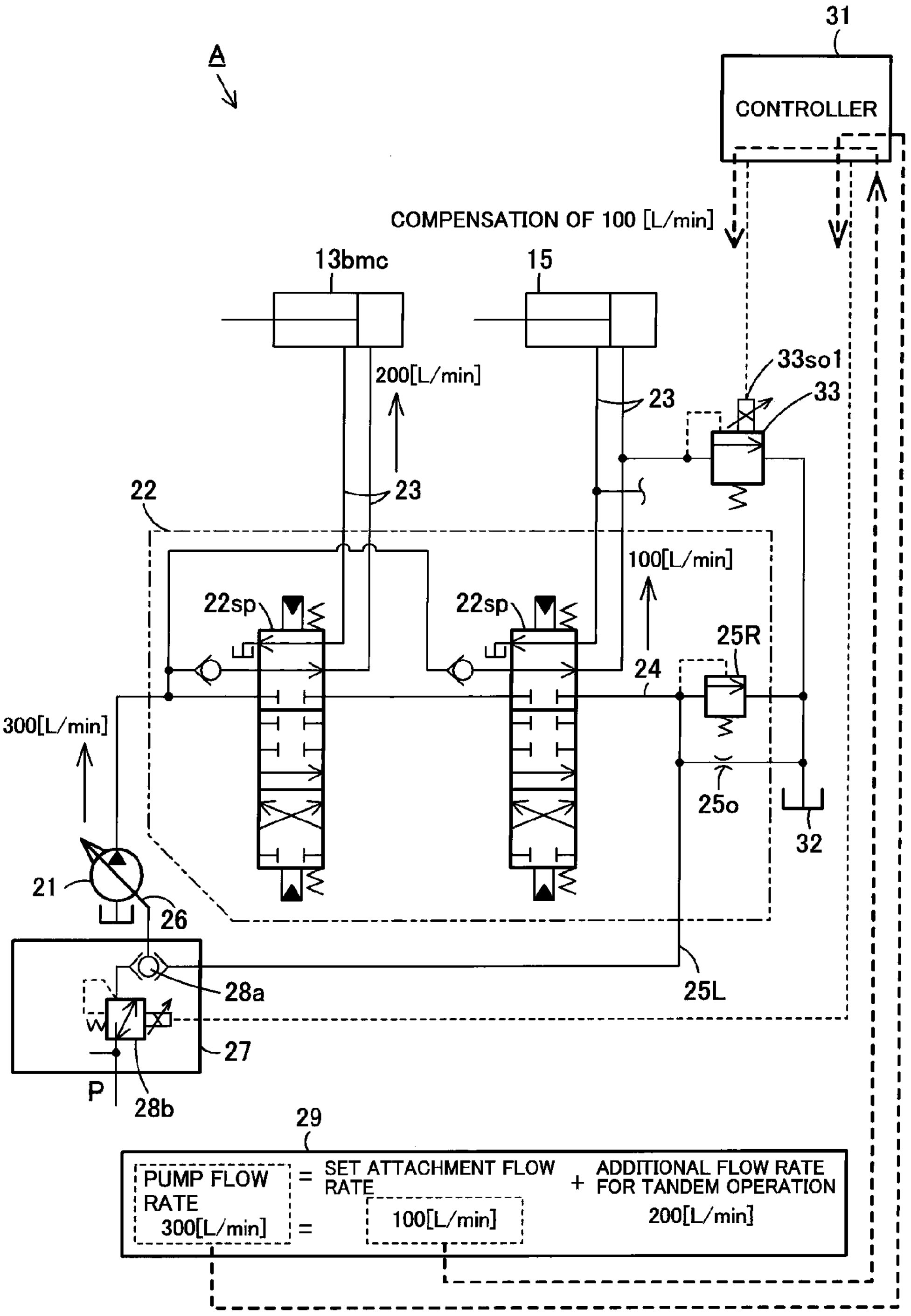
FIG. 7 is a circuit diagram illustrating the circuit configuration of the control valve shown in FIG. 1.
Figure 8:
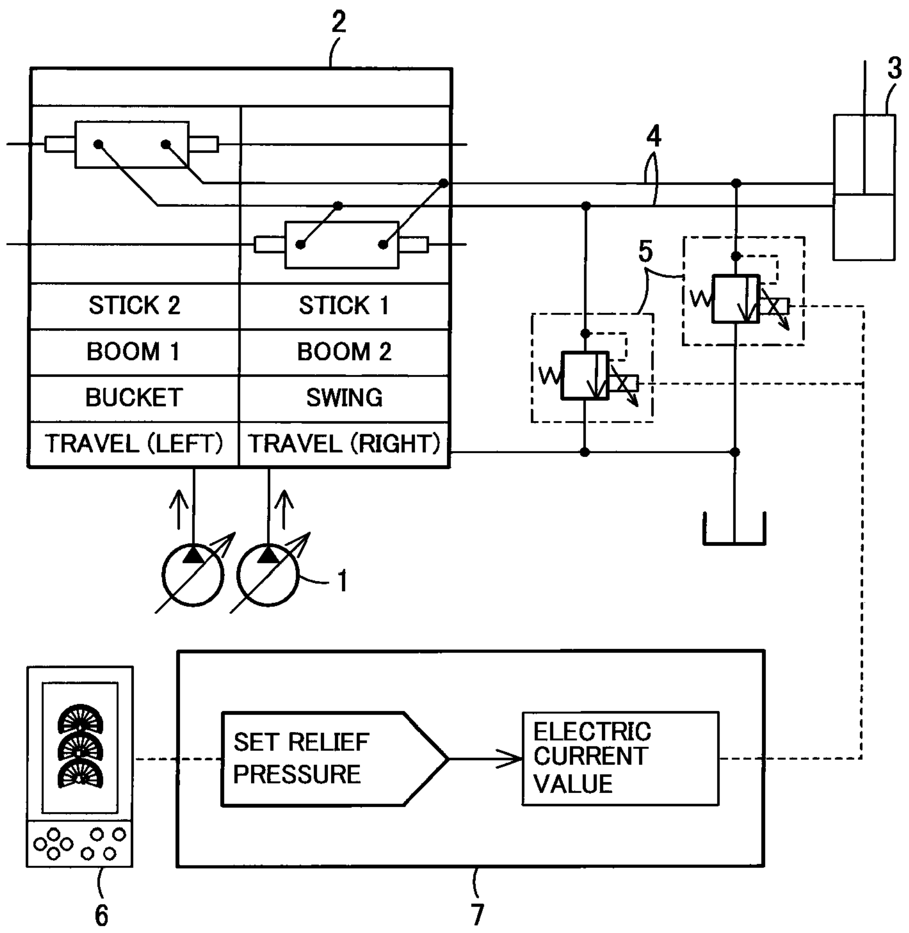
FIG. 8 is a configuration diagram showing a tool control system used in a conventional hydraulic circuit of a work machine.
Figure 9:
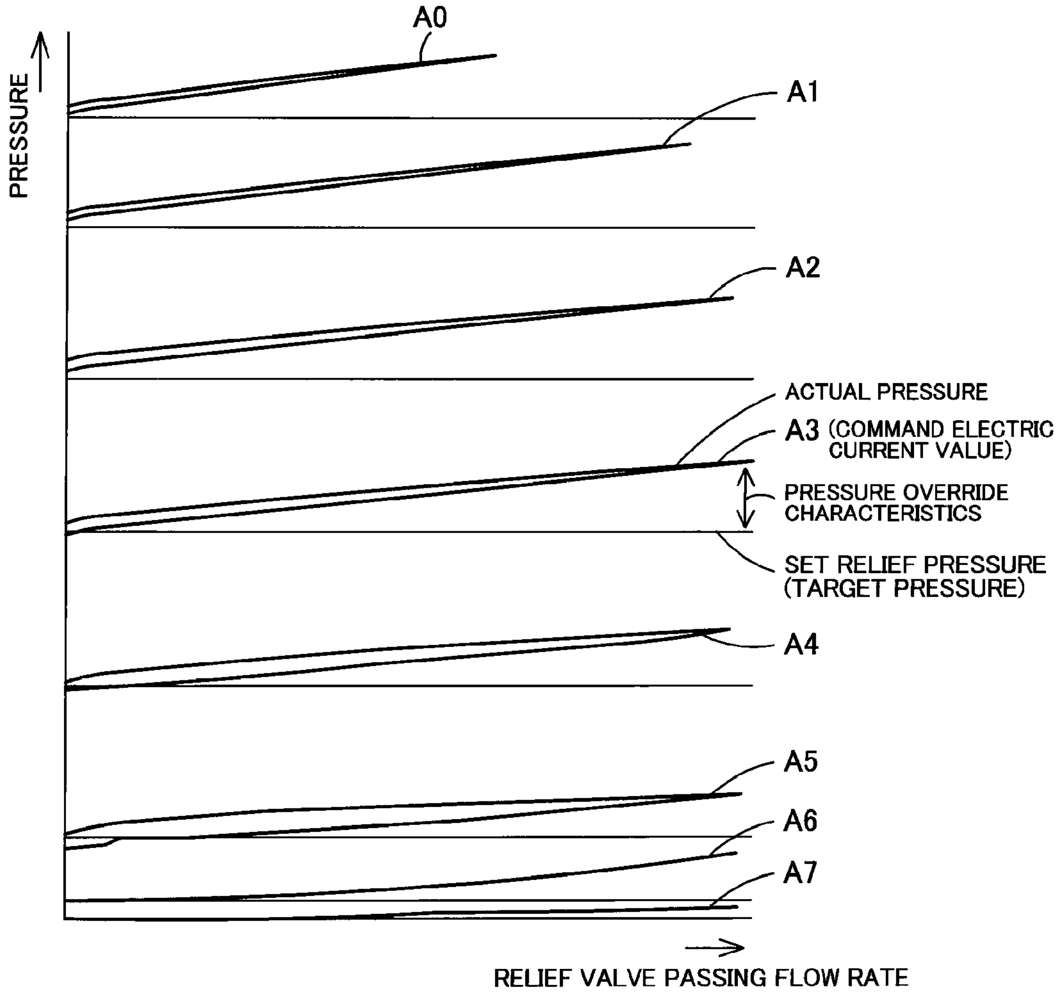
FIG. 9 is a characteristic diagram for explaining pressure override characteristics of a solenoid-operated variable pressure relief valve.

FIG. 7 illustrates, in the form of a circuit diagram, a control valve shown in FIG. 1. FIGS. 1 and 7 schematically illustrate the hydraulic circuit control device A, wherein discharge openings of variable delivery pumps 21, which are mounted on the machine body 11, are connected to the control valve 22 for controlling hydraulic oil discharged from the pumps 21. The direction and flow rate of the hydraulic oil is controlled by a plurality of actuator controlling spools 22*sp*, which form the control valve 22. Output lines 23 for the hydraulic oil are connected to various hydraulic actuators of the hydraulic excavator, such as right and left travel motors, a swing motor, the boom cylinders 13*bmc*, the stick cylinders 13*stc*, the bucket cylinder 13*bkc*, and the attachment cylinder 15.

In order to draw out negative flow control pressure (hereinafter referred to as neg-con pressure), a center bypass line 24 in the control valve 22 is provided with a relief valve 25R, an orifice 25*o*, and a neg-con pressure line 25L. Each variable delivery pump 21 is provided with a capacity adjustment means 26, which is controlled by means of neg-con pressure drawn out through the negative flow control pressure line, i.e. the neg-con pressure line 25L. The control device A performs control in such a way that the closer each actuator controlling spool 22*sp* of the control valve 22 is to the neutral position for stopping the corresponding actuator, the greater the neg-con pressure, causing the capacity adjustment means 26 to reduce the discharge rate of the variable delivery pump 21. This is the way the flow rate limiting system using neg-con pressure is structured.

Provided on the neg-con pressure line 25L is a pump flow rate limiting controller 27 for limiting pump flow rate based on a pump flow rate limiting value that is assigned to the degree of movement of the attachment cylinder 15, which serves as a specific actuator.

The pump flow rate limiting controller 27 is provided with shuttle valves 28*a*, which are provided on the neg-con pressure line 25L, and solenoid-operated proportional valves 28*b*. The solenoid-operated proportional valves 28*b* are connected to the neg-con pressure line 25L via the shuttle valves 28*a*, and are capable of controlling discharge rates of the respective variable delivery pumps 21 by using the neg-con pressure line 25L.

To be more specific, the configuration as above makes it possible to set pump discharge rates by way of a monitor 29, which is installed in the cab 12 and serves as an input means. By means of a controller 31 of the machine body of the hydraulic excavator (hereinafter referred to simply as the controller 31), which is connected to the monitor 29 and serves as a control means, a pump discharge rate set value input from the monitor 29 is converted to an appropriate electric current value, and the electric current value is input from the control means 31 to the solenoid of the corresponding solenoid-operated proportional valve 28*b*. A secondary pressure resulting from reducing a primary pressure P by the solenoid-operated proportional valve 28*b* in response to the aforementioned electric current value is applied to the capacity adjustment means 26 through the corresponding shuttle valve 28*a*, thereby controlling the discharge rate of the variable delivery pump 21.

A solenoid-operated variable pressure relief valve 33 is provided between a tank 32 and each one of the output lines 23 for the hydraulic oil, which are connected from the control valve 22 to the hydraulic actuators. The solenoid-operated variable pressure relief valves 33 serve to control the pressure of the fluid in the output lines 23 at respective set relief pressures that can be electrically commanded by way of the monitor 29 installed in the cab 12.

Each solenoid-operated variable pressure relief valve 33 is a pressure control valve for controlling the pressure in the output line 23 at a set relief pressure corresponding to a command electric current value output from the controller 31 to a solenoid 33*sol*, based on a value selected by an operator in the cab 12 by using the monitor 29.

Figure 4:
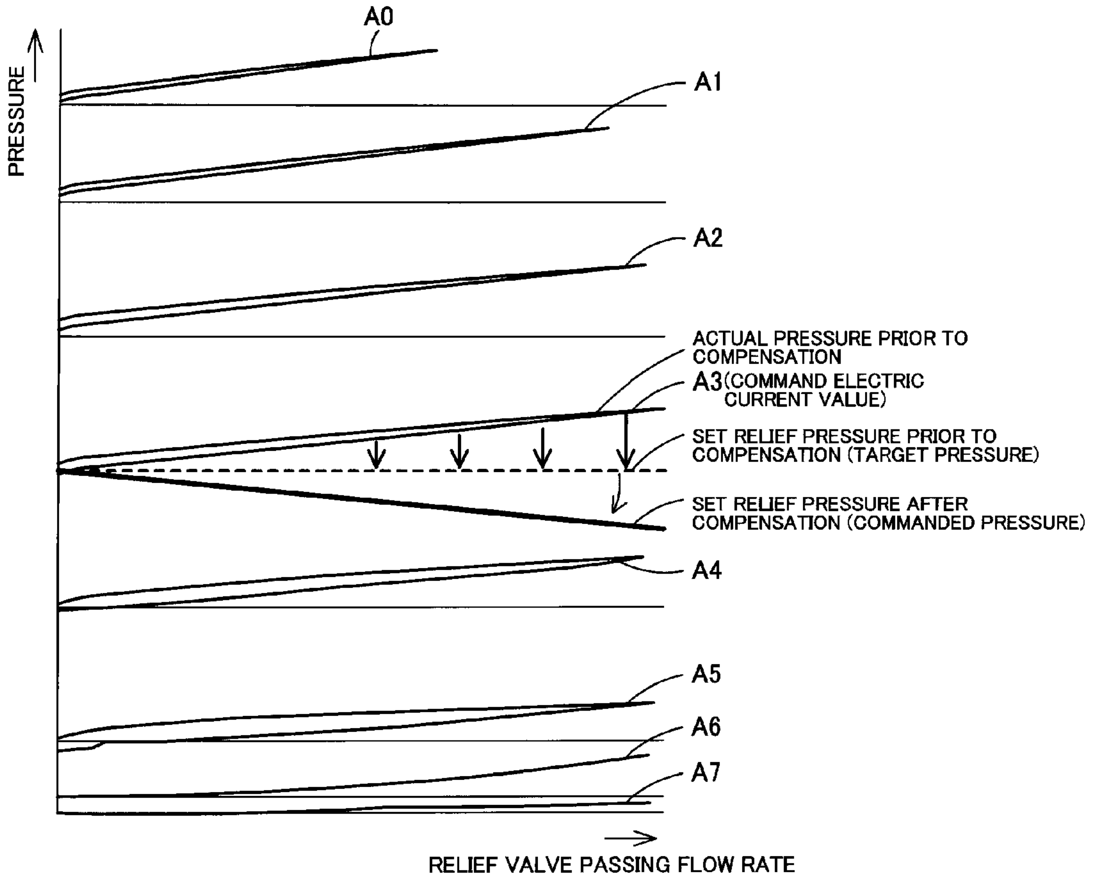
FIG. 4 is a characteristic diagram for explaining pressure override characteristics of a solenoid-operated variable pressure relief valve of the control device and the principle of compensation of the pressure override characteristics.

FIG. 4 shows characteristics of a solenoid-operated variable pressure relief valve 33 and illustrates a case where the smaller the command electric current value (A0<A<1 . . . <A6<A7), the higher the set relief pressure. Furthermore, the further the flow rate of the hydraulic oil passing through the solenoid-operated variable pressure relief valve 33 increases, the more prominent the pressure override characteristics become. In addition, pressure override characteristics change also depending on the set relief pressure (command electric current value A0 . . . A7).

From these facts, it is evident that, in order to compensate for pressure override characteristics, it is necessary to input the flow rate of the hydraulic oil passing through the relief valve, in other words the relief valve passing flow rate, at the moment when compensation is performed, as well as the set relief pressure.

As shown in FIG. 1, when controlling the pressure of the attachment cylinder 15 at a set relief pressure by means of the solenoid-operated variable pressure relief valves 33, two types of signals for each solenoid-operated variable pressure relief valve 33, i.e. a set relief pressure Prel and a set attachment flow rate Qatt, which is a relief valve passing flow rate, are input from the monitor 29 to the controller 31. By compensating for the unadjusted set relief pressure shown by dotted line in FIG. 4, i.e. the target pressure, to the set relief pressure shown by solid line in FIG. 4, i.e. the commanded pressure, the actual pressure (for example the pressure shown by the command electric current value A3) is brought close to the set relief pressure shown by dotted line, i.e. the target pressure.

For this purpose, as shown in FIG. 1, the controller 31 includes an override compensation pressure calculation section 34, a subtraction section 35, and a converter 36. The override compensation pressure calculation section 34 calculates an override compensation pressure ΔP from a set relief pressure Prel and a set attachment flow rate Qatt. The subtraction section 35 calculates a set relief pressure that results from compensation of pressure override and serves as a commanded pressure, by subtracting the override compensation pressure ΔP, which corresponds to the set attachment flow rate and has been calculated by the override compensation pressure calculation section 34, from the set relief pressure Prel. The commanded pressure is then converted to an electric current value by the converter 36.

The controller 31 includes a converter section 37, which converts pump discharge rate set values input from the monitor 29 to appropriate electric current values, and outputs the electric current values to the solenoids of the respective solenoid-operated proportional valve 28*b*. Each solenoid-operated proportional valve 28*b* produces a secondary pressure by reducing a primary pressure P in accordance with the electric current value input from the controller 31, and applies the secondary pressure to the capacity adjustment means 26 of the variable delivery pump 21 through the shuttle valve 28a, thereby controlling discharge rate of the variable delivery pump 21.

As described above, in order to solve the problem of pressure override characteristics of a solenoid-operated variable pressure relief valve 33 causing a difference between a set relief pressure and an actual pressure, the present example provides a structure of a system that is capable of simultaneously performing compensation of pressure override characteristics in accordance with a relief valve passing flow rate and compensation of pressure override characteristics in accordance with the set relief pressure.

Furthermore, in order to solve the above problem, it is desirable to perform feedback control of override pressure, i.e. error pressure resulting from pressure override characteristics, and relief flow rate. However, it is difficult for a circuit that includes a solenoid-operated variable pressure relief valve 33 to be provided with a flow meter and a pressure gauge. Therefore, the examples employ feedforward control using values described below, i.e. estimated values and values prepared beforehand, as override pressures and relief valve passing flow rates of the solenoid-operated variable pressure relief valves 33.

Next, how compensation is performed is explained.

First of all, in this example, as shown in FIG. 4, pressure override characteristics of the solenoid-operated variable pressure relief valves 33 provided for the attachment tool 14 are ascertained based on designed values, benchmark data, and data on the actual machine.

Next, the relief valve passing flow rates of the fluid passing through the solenoid-operated variable pressure relief valves 33 are estimated. The estimated relief valve passing flow rates are used based on the assumption that the set attachment flow rates Qatt for controlling the attachment tool are regarded as control input related to the relief valve passing flow rates.

In other words, when operating the attachment cylinder 15 of an attachment tool 14, pump flow rate limiting control is normally performed to limit pump flow rates appropriate for the attachment tool 14 mounted on the work equipment 13 by using the solenoid-operated proportional valves 28b, which serve to control the neg-con pressure, so as to prevent hydraulic oil from flowing to the attachment cylinder 15 at an excessively great flow rate. The pump flow rate limiting values assigned to the respective attachment tools 14 are set beforehand by using the monitor 29. The pump flow rate limiting values set by the monitor 29 are used as the aforementioned set attachment flow rates Qatt for controlling the attachment tools, in other words as estimated values of flow rates of the hydraulic oil passing through the solenoid-operated variable pressure relief valves 33.

Figure 2:
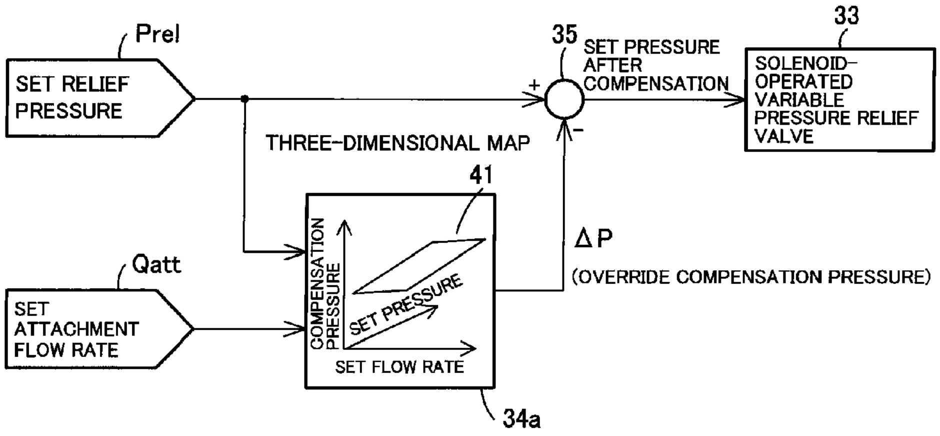
FIG. 2 is a block diagram showing a first example of the compensation logic of the aforementioned control device.
Figure 3:
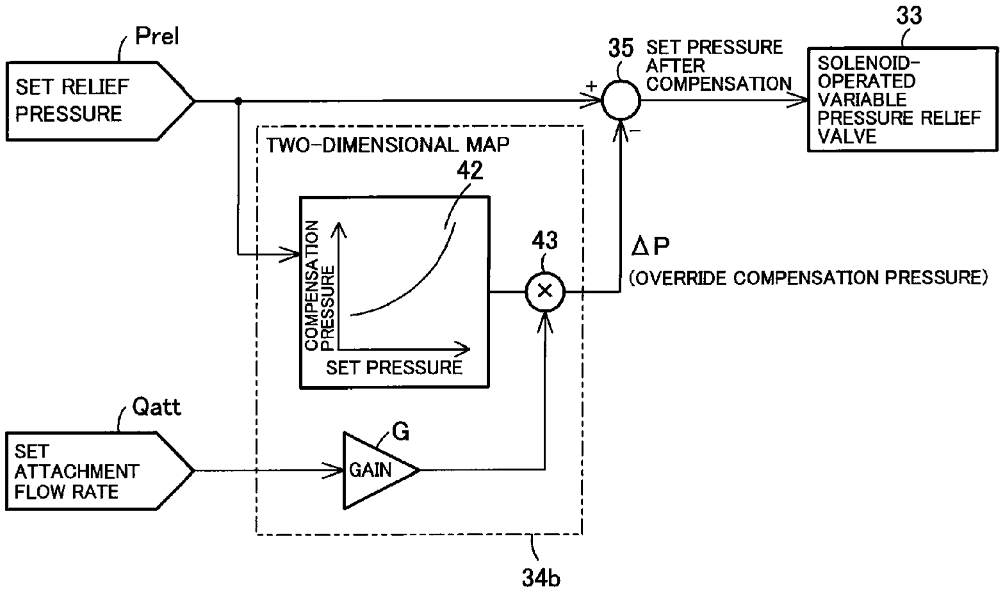
FIG. 3 is a block diagram showing a second example of the compensation logic of the control device.

Next, either the control logic shown in FIG. 2 or the control logic shown in FIG. 3 is applied.

The control logic shown in FIG. 2 is a compensation method wherein the override compensation pressure calculation section 34a uses set relief pressures Prel, set attachment flow rates Qatt described above, and a three-dimensional map 41 that is created beforehand based on the relationship between an override compensation pressure ΔP and these values Prel, Qatt.

As described in the example above, the pressure override characteristics that have been ascertained beforehand are formed into a three-dimensional map. Then, by inputting a set relief pressure Prel and a set attachment flow rate Qatt described above to the pressure override characteristics that have been formed into the three-dimensional map, an override compensation pressure ΔP for each solenoid-operated variable pressure relief valve is calculated. Thereafter, the override compensation pressure ΔP is subtracted from the set relief pressure Prel so that the solenoid-operated variable pressure relief valve 33 is controlled based on the electric current value that corresponds to the adjusted set relief pressure (commanded pressure) resulting from the compensation of the pressure override characteristics.

The control logic shown in FIG. 3 is a simple logic that can be employed in cases where linear approximation of pressure override characteristics with respect to relief valve passing flow rates is possible. This simple logic uses an override compensation pressure calculation section 34b that can be realized relatively easily without using a three-dimensional map 41 described above.

As shown in FIG. 4, the override compensation pressure calculation section 34b uses a two-dimensional map 42 that is created beforehand based on the relationship between a plurality of set relief pressures Prel that are respectively represented by electric current values A0-A7 and override pressures at a constant flow rate (flow rate-pressure gradient) resulting from linear approximation of pressure override characteristics with respect to relief valve passing flow rates at the respective set relief pressures Prel. By inputting a set relief pressure Prel to the two-dimensional map 42, the override compensation pressure calculation section 34b determines an override pressure at a constant flow rate (flow rate-pressure gradient).

Furthermore, influence of the attachment flow rate Qatt is adjusted by multiplying the attachment flow rate Qatt by a gain G. An override compensation pressure ΔP at the attachment flow rate Qatt is calculated by multiplying the override pressure at a constant flow rate (flow rate-pressure gradient) by the aforementioned attachment flow rate G*Qatt by means of a multiplier 43 connected to the two-dimensional map 42. Then, the override compensation pressure ΔP is subtracted from the set relief pressure Prel so that the solenoid-operated variable pressure relief valve 33 is controlled by means of the electric current value corresponding to the adjusted set relief pressure (commanded pressure) that resulted from compensation of the pressure override characteristics.

Figure 5:
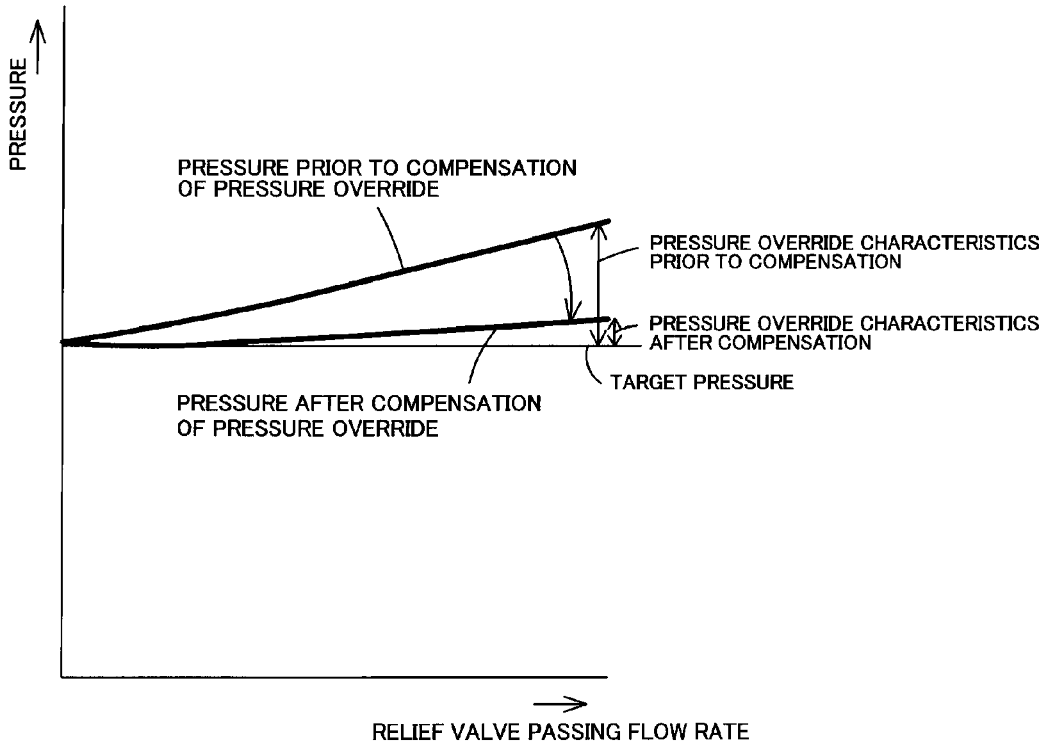
FIG. 5 is a characteristic diagram showing an example of compensation of pressure override characteristics of the solenoid-operated variable pressure relief valve of the control device.

FIG. 5 shows results of tests conducted to examine pressure override compensation. From the test results, it is evident that pressure override characteristics prior to compensation were drastically reduced and became close to a target pressure by the pressure override compensation as represented by commanded pressure shown in FIG. 4. In other words, the invention is capable of drastically improving accuracy of relief pressure for a solenoid-operated variable pressure relief valve 33 with respect to target pressure.

As shown in FIG. 7, according to an example of the method of the present invention, an override compensation pressure for a solenoid-operated variable pressure relief valve 33 is calculated by using an attachment flow rate Qatt, which is used for setting the flow rate of the hydraulic oil that is expected to flow into the attachment cylinder 15 of the attachment tool 14, and the commanded pump flow rate for controlling the capacity adjustment means 26 of the variable delivery pumps 21 are not used for calculation of the override compensation pressure.

Figure 10:
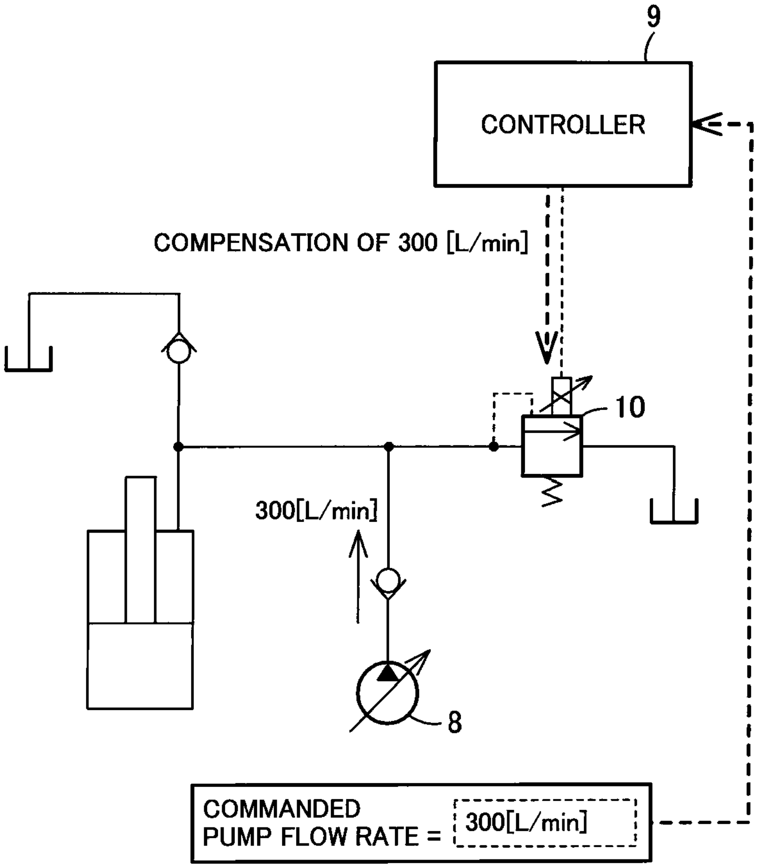
FIG. 10 is a circuit diagram showing a conventional pressure override compensation system.

On the other hand, according to conventional hydraulic control, such as the hydraulic press control shown in FIG. 10, an override compensation pressure is calculated based on a commanded pump flow rate. However, should this method be applied without adjustment to a flow limiting system that uses neg-con pressure, an override compensation pressure would be calculated based on a pump command flow rate, which is the sum of a set attachment flow rate and an additional flow rate for tandem operation, which is required when operating the attachment simultaneously with another actuator.

As described above, the hydraulic circuit for simultaneously operating the plurality of actuators by means of hydraulic fluid includes the controller 31 and the solenoid-operated variable pressure relief valves 33 that serve to control pressure in the lines 23 to the attachment cylinder 15, wherein the controller 31 is capable of outputting to each solenoid-operated variable pressure relief valve 33 a command signal related to the set relief pressures for the solenoid-operated variable pressure relief valve 33 of which pressure override characteristics have been compensated for based on input signals related to the set relief pressure and a relief valve passing flow rate. Therefore, the examples are capable of improving accuracy of relief pressure with respect to a set relief pressure for a solenoid-operated variable pressure relief valve 33 that is provided for controlling working pressure of the attachment cylinder 15.

Furthermore, exact override compensation can be performed by using the override compensation pressure calculation section 34*a*, which is provided with the three-dimensional map 41, as well as the subtraction section 35 for calculating an adjusted set relief pressure, which is the set relief pressure resulting from the pressure override compensation.

Furthermore, override compensation can be easily performed by using the override compensation pressure calculation section 34*b*, which is provided with the two-dimensional map 42 created by linear approximation of the aforementioned pressure override characteristics with respect to relief valve passing flow rates, as well as the subtraction section 35 for calculating an adjusted set relief pressure, which is the set relief pressure resulting from the pressure override compensation.

Furthermore, the pump flow rate limiting controller 27 is provided on the neg-con pressure line 25L and controls a pump flow rate based on the pump flow rate limiting value that is set by the monitor 29 and is assigned to the attachment that is going to be used; and the controller 31 uses the aforementioned pump flow rate limiting value for the pump flow rate limiting controller 27, i.e. the set attachment flow rate, as the estimated value representing the flow rate passing through a solenoid-operated variable pressure relief valve 33. Therefore, flow rate passing through the solenoid-operated variable pressure relief valve 33 can be limited easily by using a pump flow rate limiting value that is set by the monitor 29.

Furthermore, the examples of the present invention provide a work machine M of which accuracy of a relief pressure with respect to a set relief pressure for each respective solenoid-operated variable pressure relief valve 33 that serves to control working pressure of the attachment cylinder 15 for operating the attachment tool 14 attached to the distal end of the work equipment 13 can be improved by compensating for pressure override characteristics of the solenoid-operated variable pressure relief valves 33.

The present invention is applicable in any industry that is involved in production and sales of hydraulic circuit control devices and work machines.

The invention claimed is:

1. A hydraulic circuit control device for controlling a hydraulic circuit that serves to operate a hydraulic actuator by means of hydraulic fluid, the hydraulic circuit control device comprising:

a solenoid-operated variable pressure relief valve adapted to control pressure of the hydraulic fluid fed to the hydraulic actuator at a first set relief pressure to be set in accordance with a command signal; and a controller including an override compensation pressure calculation section which is configured to receive a second set relief pressure and a relief valve passing flow rate to calculate an override compensation pressure, and output to the solenoid-operated variable pressure relief valve the command signal related to an adjusted set relief pressure that results from the calculated override compensation pressure.

2. The hydraulic circuit control device as claimed in claim 1, wherein the override compensation pressure calculation section is configured to calculate the override compensation pressure compensating for pressure override characteristics, the override compensation pressure calculation section performing the calculation by inputting the second set relief pressure and the relief valve passing flow rate to a three-dimensional map that is created beforehand based on a relationship among a set relief pressure, a relief valve passing flow rate, and an override compensation pressure; and a subtraction section calculating the adjusted set relief pressure resulting from the compensation of the pressure override characteristics, the subtraction section performing the calculation by subtracting from the second set relief pressure the override compensation pressure calculated by the override compensation pressure calculation section.

3. The hydraulic circuit control device as claimed in claim 1, wherein the override compensation pressure calculation section is configured to calculate the override compensation pressure by:

determining characteristics of a relationship between a relief valve passing flow rate and an override pressure by inputting the second set relief pressure to a two-dimensional map that is created beforehand based on a relationship between a plurality of set relief pressures and override pressures at a constant flow rate resulting from linear approximation of pressure override characteristics with respect to the relief valve passing flow rates at the respective set relief pressures, and multiplying the determined characteristics by the received relief valve passing flow rate; and a subtraction section calculating the adjusted set relief pressure resulting from the compensation of the pressure override characteristics, the subtraction section performing the calculation by subtracting from the second set relief pressure the override compensation pressure calculated by the override compensation pressure calculation section.

4. The hydraulic circuit control device as claimed in claim 1, wherein:

the hydraulic circuit control device includes:

a negative flow control pressure line guiding negative flow control pressure from a center bypass line of a control valve that serves to control a plurality of hydraulic actuators to a capacity adjustment means of a variable delivery pump, a pump flow rate limiting controller that is provided on the negative flow control pressure line and serves to limit pump flow rate based on a pump flow rate limiting value that is assigned to a specific actuator, and an input device in which a pump flow rate limiting value to be output to the pump flow rate limiting controller is set; and the controller uses, as an estimated value representing a flow rate of the hydraulic fluid passing through a solenoid-operated variable pressure relief valve that controls the specific actuator, the pump flow rate limiting value that is set in the input device.

5. A work machine comprising:

a machine body;

a work equipment mounted on the machine body and adapted to be operated by a plurality of hydraulic actuators;

an attachment tool attached to the distal end of the work equipment; and a hydraulic circuit control device as claimed in claim 1 and provided for a hydraulic actuator for operating the attachment tool.

* * * * *